(12) United States Patent
Mohan

(10) Patent No.: US 7,184,716 B2
(45) Date of Patent: Feb. 27, 2007

(54) LOW COST/LOW POWER ANALOG TRANSCEIVER ARCHITECTURE

(75) Inventor: Chandra Mohan, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 296 days.

(21) Appl. No.: 10/220,117

(22) PCT Filed: Feb. 28, 2001

(86) PCT No.: PCT/US01/06402

§ 371 (c)(1),
(2), (4) Date: Jun. 3, 2003

(87) PCT Pub. No.: WO01/65707

PCT Pub. Date: Sep. 7, 2001

(65) Prior Publication Data

US 2004/0009752 A1    Jan. 15, 2004

Related U.S. Application Data

(60) Provisional application No. 60/185,584, filed on Feb. 28, 2000.

(51) Int. Cl.
*H04B 1/44* (2006.01)

(52) U.S. Cl. .................. 455/78; 455/114.2; 455/127.4; 455/227; 455/102; 455/109; 455/203; 455/260; 375/224; 375/301; 375/321; 375/270

(58) Field of Classification Search ............... 455/102, 455/108, 109, 127.4, 227, 260, 47, 203, 73, 455/114.2, 78; 375/224, 301, 321, 270
See application file for complete search history.

(56) References Cited

U.S. PATENT DOCUMENTS

| 1,525,862 | A |   | 2/1925 | Granstedt |
| 4,803,700 | A |   | 2/1989 | Dewey et al. |
| 4,817,192 | A | * | 3/1989 | Phillips et al. ............... 455/75 |
| 4,994,769 | A |   | 2/1991 | Kishi |
| 5,222,250 | A | * | 6/1993 | Cleveland et al. ........... 455/47 |

(Continued)

FOREIGN PATENT DOCUMENTS

EP    963 053 A2    12/1999

(Continued)

*Primary Examiner*—Marceau Milord
(74) *Attorney, Agent, or Firm*—Joseph J. Laks; Robert B. Levy; Joseph J. Kolodka

(57) ABSTRACT

A time division duplex (TDD) single sideband (SSB) transceiver includes a transmitter adapted to input an analog audio signal, sample the analog audio signal, and to output an SSB frequency shift keyed (FSK) signal corresponding to the analog audio signal, the SSB FSK signal including analog information. A receiver is adapted to switch between receiving one of an upper sideband and a lower sideband of an external SSB signal.

8 Claims, 1 Drawing Sheet

U.S. PATENT DOCUMENTS

| | | | |
|---|---|---|---|
| 5,241,566 A | 8/1993 | Jackson | 375/62 |
| 5,603,110 A * | 2/1997 | Heinzmann | 455/203 |
| 5,794,131 A * | 8/1998 | Cairns | 455/76 |
| 5,995,534 A * | 11/1999 | Fullerton et al. | 375/146 |
| 6,002,924 A * | 12/1999 | Takano | 455/161.1 |
| 6,141,141 A * | 10/2000 | Wood | 359/326 |
| 6,259,253 B1 * | 7/2001 | Ellingson | 324/322 |
| 6,339,621 B1 * | 1/2002 | Cojocaru et al. | 375/247 |
| 6,351,500 B2 * | 2/2002 | Kumar | 375/270 |
| 6,526,262 B1 * | 2/2003 | Kurlovich | 455/75 |
| 6,671,332 B1 * | 12/2003 | Haubrich | 375/334 |
| 6,816,559 B1 * | 11/2004 | Sirito-Olivier et al. | 375/344 |
| 6,847,255 B2 * | 1/2005 | Petrovic et al. | 329/323 |
| 7,058,364 B2 * | 6/2006 | Atkinson et al. | 455/76 |

FOREIGN PATENT DOCUMENTS

| | | |
|---|---|---|
| JP | 8130492 | 5/1996 |
| RU | 2079971 | 5/1997 |

* cited by examiner

US 7,184,716 B2

LOW COST/LOW POWER ANALOG TRANSCEIVER ARCHITECTURE

This application claims the benefit under 35 U.S.C. § 365 of International Application PCT/US01/06402, filed Feb. 28, 2001, which claims the benefit of U.S. Provisional Application, Ser. No. 60/185,584 filed Feb. 28, 2000.

BACKGROUND OF THE INVENTION

1. Technical Field

The present invention relates generally to transceivers and, in particular, to a transceiver having a single sideband (SSB) frequency shift keyed (FSK) transmitter system and an associated Zero intermediate frequency (IF) architecture for receiving a transmitted signal.

2. Description of Related Art

Most architectures for low cost 900 MHz and 2.4 GHz portable residential wireless systems employ either Frequency Division Duplex (FDD) or Time Division Duplex (TDD) architectures. TDD architectures use digital modulation schemes so that digitized voice can be buffered and burst out during a transmission and then converted back to a normal rate after rate conversion in the receiver base band circuits. The TDD architectures result in very low cost radio frequency (RF) architectures as there is no need for Duplex filters and also due to the fact that only one phased locked loop (PLL) is needed to support a two-way communication link. However, due to the cost constraints on realizing an Integrated Circuit (IC) with all the necessary base band signal processing, a TDD approach is not the lowest cost solution.

Frequency Division Duplex is generally used by analog systems that transmit and receive at distinctly different frequency bands. To prevent transmitter power from degrading receiver performance, expensive surface acoustic wave (SAW) or dielectric filters are used in the front-end. In FDD, since the analog signal is transmitted without conversion into the digital domain, the cost of the base band sections are low. However, the RF sections are more expensive and the receive and transmit bands occupy a relatively small bandwidth of the available spectrum. In contrast, a TDD system is capable of operating over the entire available bandwidth.

Accordingly, there is a need for an analog transceiver architecture that overcomes the preceding deficiencies of prior art TDD and FDD architectures.

SUMMARY OF THE INVENTION

The problems stated above, as well as other related problems of the prior art, are solved by the present invention, a single sideband (SSB) analog transceiver. The SSB analog transceiver of the invention provides an alternative to the more expensive (in terms of cost and power) transceivers of the prior art, while providing many attendant benefits in comparison thereto.

According to a first aspect of the invention, there is provided a time division duplex (TDD) single sideband (SSB) transceiver. The transceiver includes a transmitter adapted to input an analog audio signal, sample the analog audio signal, and to output an SSB frequency shift keyed (FSK) signal corresponding to the analog audio signal, the SSB FSK signal including analog information. A receiver is adapted to switch between receiving one of an upper sideband and a lower sideband of an external SSB signal.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
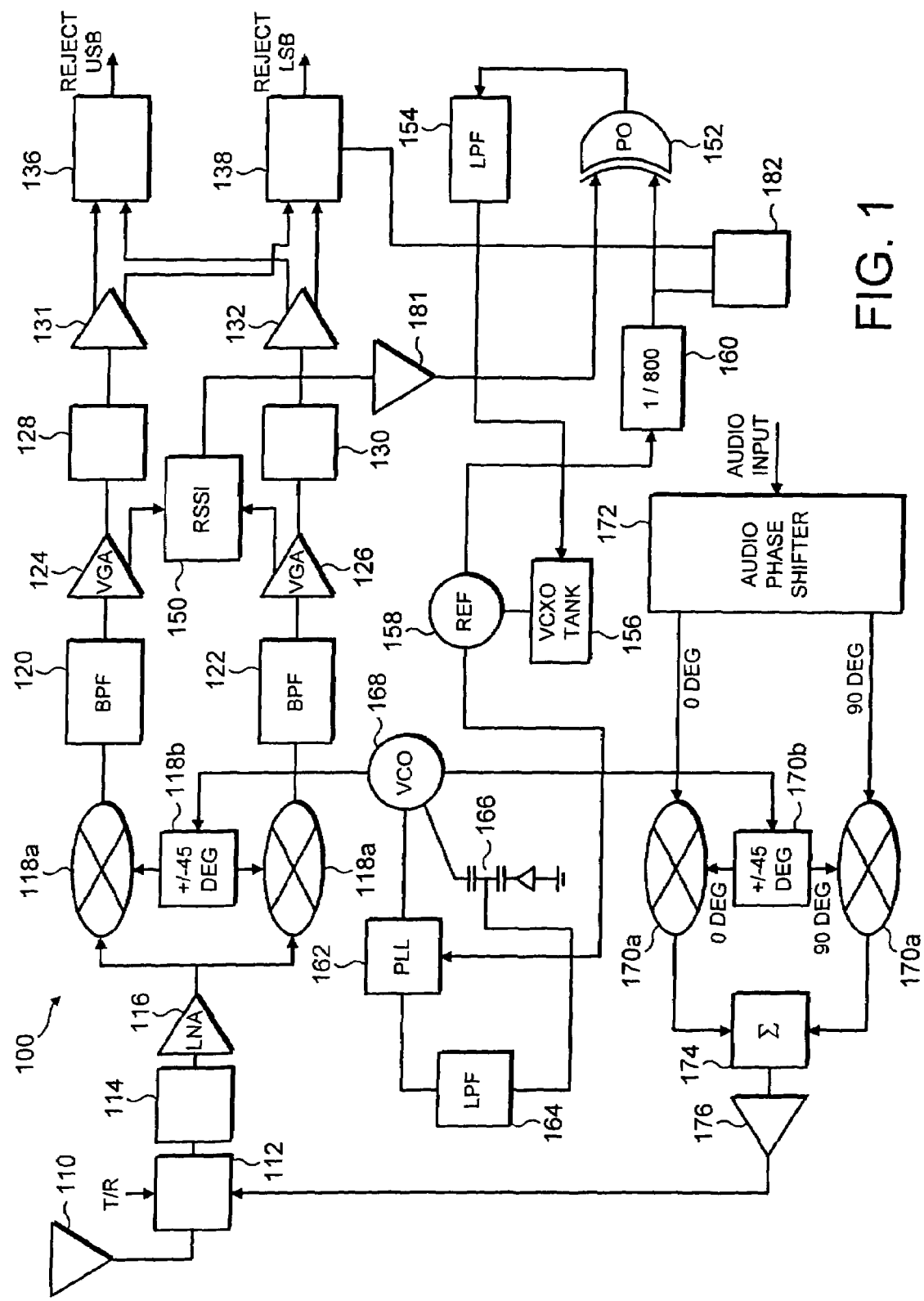
FIG. 1 is a block diagram illustrating a 900 MHz single sideband (SSB) analog transceiver, according to an illustrative embodiment of the invention.

The present invention is directed to a single sideband (SSB) analog transceiver. In a preferred embodiment of the invention described herein, the transceiver is used for a low cost, high performance 900 MHz analog telephone.

In particular, the invention provides a technique to realize a Time Division Duplex (TDD) system with a Quasi Zero intermediate frequency (IF) approach, while transmitting an analog signal sampled at a 4× rate that also serves as the TDD rate. The audio signal is phase shifted into 0 degree and 90 degree signals by an audio phase shift r 172 and modulated by a quadrature modulator. The output from the quadrature modulator is an SSB frequency shift keyed (FSK) signal that contains analog information. The deviation is between −fm and f0. The output of the quadrature modulator (see 170*a,b*, FIG. 1) is summed up and fed into a transmit driver that can output 0 dBm output to the antenna. The 180 degree and 270 degree outputs of the audio phase shifter can be used to generate the upper sideband signal between f0 and +fm.

FIG. 1 is a block diagram illustrating a low power 900 MHz SSB analog transceiver 100, according to an illustrative embodiment of the invention. The SSB transceiver 100 includes: an antenna 110; a transmit/receive switch (T/R) 112; a radio frequency (RF) filter 114; a low noise amplifier (LNA) 116; a first dual double balanced mixer 118*a* with a 90 degree phase shifter 118*b*; a first band pass filter (BPF) 120; a second BPF 122; a first variable gain amplifier (VGA) 124; a second VGA 126; an audio phase shift circuit 127 that includes an I channel audio phase shifter 128 and a Q channel audio phase shifter 130; a first buffer amplifier 131; a second buffer amplifier 132; a summation network 136; a differential network 138; an RSSI 150; a level converter 181; a phase detector (PD) 152; a first low pass filter (LPF) 154; a VCXO Tank 156; a synthesizer reference frequency generator (ref) 158; a 1/800 divider 160; a phase locked loop (PLL) 162; a second LPF 164; a varactor 166; a voltage controlled oscillator (VCO) 168; a second dual double balanced mixer 170*a* with a 90 degree phase shifter 170*b*; an audio phase shifter 172; a summing amplifier 174; a power amp 176; and a link management device 182.

In the receiver mode, a signal is received by the antenna 110, filtered by the RF filter 114, amplified by the LNA 116, and is then split into two branches. An in-phase and a quadrature phase signal from the +/−45 degree phase shifter 118*b* (which receives input from the local oscillator (VCO 168) are mixed with the two branches in the first dual double balanced mixer 118 to provide I and Q outputs. The I and Q outputs are filtered by the first BPF 120 and the second BPF 122, respectively. BPFs 120, 122 can be either band pass or low pass filters. The filtered I and Q outputs are amplified by the first VGA 124 and second VGA 126, respectively. The amplified and filter d I and Q outputs are then fed into an audio phase shift circuit 127 that includes the I channel audio phase shifter 128 and the Q channel audio phas shifter 130. The outputs of the audio phase shift circuit 127 are input into the summation network 136 and the differential network 138 after level equalization in the buffer amplifiers 131, 132. The process performed by the audio phase shifter 127 and the summation network 136 or the difference network 138 results in the dot products of I and Q with 90 degree phase shifted versions. The output of the summation network 136 will be the lower sideband of the transmitted signal, whereas the output of the differential network 138 will be the upper sideband.

For the system to operate satisfactorily, DC offsets arising out of RF carrier offsets between the handset transmitter Local oscillator (VCO 168) and the base receiver local oscillator must first be compensated. If this offset is not compensated, then there will be distortion in the demodulated audio due to the superposition of the Doppler signal with the wanted audio signal. The receiver will track the transmitter frequency using a frequency tracking loop as described immediately hereafter. The ref 158, which is 9.6 MHz, is used as the reference frequency oscillator for the PLL 162 to control the VCO 168. A unique reference frequency oscillator 156 is used so that a +/−40 kHz tracking range is realizable. The reference frequency (9.6 MHz) is divided by 800 (by the 1/800 divider 160) to realize a 12 KHz signal that is used to toggle the transceiver from the transmit to the receive state. The design of the variable gain amplifiers 124, 126 in the receiver has to be faster than 20 microseconds to ensure that there is no local oscillator induced self-jamming on the receiver. Since the transmitter and receiver signals are at the same frequency, any leakage of the transmitter signal into the receiver signal will make it impossible for the receiver to detect any low level input signal from the antenna 110. The transmit T/R signal thus samples the FSK modulated transmit signal at 12 KHz which is almost 3× the audio frequency and thus satisfies the Nyquist Criteria. The receiver first tracks the 12 KHz TIR signal and compares the received 12 KHz with respect to the receiver's local 12 KHz. The phase detector 152 is used to find the frequency error in the local 12 KHz signal, which is integrated and fed as a control signal to the receiver VCXO 156. During the initial phase of acquisition, there is no data sent over the link. Once th tracking commences, the recovered receive signal is fed to a bandpass signal that will filter out the T/R signal and pass the received audio to a loudspeaker.

A description will now be given of some of the many advantages of the present invention. The invention provides drift compensation, thereby providing long time stability. Moreover, the invention allows for full band operation (26 Mhz). Also, the invention is alignment free. Additionally, the invention employs a low cost RF architecture, and provides double the number of channels with respect to prior art transceivers (enabling the user to decide whether to use the upper side band or the lower side band). Further, the invention includes automatic clear channel selection (an interference avoidance mechanism). The interference avoidance mechanism includes link management device 182 which, according to one illustrative embodiment of the invention, is a micro-controller software based decision module. Of course, other devices may be used while maintaining the spirit and scope of the invention. The link management device 182 switches from the upper sideband to the lower sideband and vice versa when interference is detected during transmission or reception.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A time division duplex (TDD) single sideband (SSB) transceiver, comprising:
   a transmitter adapted to input an analog audio signal, sample the analog audio signal, and to output an SSB frequency shift keyed (FSK) signal corresponding to the analog audio signal, the SSB FSK signal including analog information;
   a receiver adapted to switch between receiving one of an upper sideband and a lower sideband of an external SSB signal and, link management device adapted to detect interference when said receiver is receiving one of the upper sideband and the lower sideband of the external SSB signal to provide a control signal to the receiver in response thereto, and to detect the interference when said transmitter is transmitting one of the upper sideband and the lower sideband of the analog audio signal to provide the control signal to the receiver in response thereto.

2. The TDD SSB transceiver according to claim 1, wherein said receiver comprises:
   a receiver local oscillator adapted to generate an analog signal;
   a dual double balanced mixer adapted to mix an in-phase signal and a quadrature phase signal of the analog signal generated by the receiver local oscillator—with the external SSB signal to output a mixed in-phase signal and a mixed quadrature phase signal;
   a summation network adapted to perform a summation operation with respect to the mixed in-phase signal and the mixed quadrature phase signal, so as to output the lower sideband of the external SSB signal; and
   a differential network adapted to perform a difference operation with respect to the mixed in-phase signal and the mixed quadrature phase signal, so as to output the upper sideband of the external SSB signal.

3. The TDD SSB transceiver according to claim 1, wherein said transmitter further comprises:
   a phase shifter adapted to phase shift the analog audio signal into 0 degree, 90 degree, 1 80 degree, and 270 degree signals; and
   a quadrature modulator adapted to output a lower sideband signal of the analog audio signal from the 0 degree signal and the 90 degree signal, and to output an upper sideband signal of the analog audio signal from the 180 degree signal and the 270 degree signal.

4. The TDD SSB transceiver according to claim 1, wherein said receiver is adapted to switch between receiving one of the upper sideband and the lower sideband of the external SSB signal in response to the control signal, and said transmitter is adapted to switch between transmitting one of the upper sideband and the lower sideband of the analog audio signal in response to the control-signal.

5. A time division duplex (TDD) single sideband (SSB) transceiver, comprising:
   a quadrature modulator adapted to modulate analog audio signals for transmission;
   a first sideband switch adapted to switch between transmitting an upper sideband signal and a lower sideband signal of an analog audio signal;
   a second sideband switch adapted to switch between receiving one of an upper sideband signal and a lower sideband signal of an external SSB signal and, a link management device adapted to detect interference when said TDD SSB transceiver is receiving one of the upper sideband and the lower sideband of the external SSB signal to provide a control signal to the second sideband switch in response thereto, and to detect interference when said TDD SSB transceiver is transmitting one of the upper sideband and the lower sideband of the analog audio signal to provide the control signal to the first sideband switch in response thereto.

6. The TDD SSB transceiver according to claim 5, further comprising a receiver local oscillator adapted to generate an analog signal, and wherein said second sideband switch comprises:
- a dual double balanced mixer adapted to mix an in-phase signal and a quadrature phase signal of the analog signal generated by the receiver local oscillator with the external SSB signal to output a mixed in-phase signal and a mixed quadrature phase signal;
- a summation network adapted to perform a summation operation with respect to the mixed in-phase signal and the mixed quadrature phase signal, so as to output the lower sideband of the external SSB signal; and
- a differential network adapted to perform a difference operation with respect to the mixed in-phase signal and the mixed quadrature phase signal, so as to output the upper sideband of the external SSB signal.

7. The TDD SSB transceiver according to claim 5, further comprising a phase shifter adapted to phase shift the analog audio signal into 0 degree, 90 degree, 180 degree, and 270 degree signals; and wherein said quadrature modulator is adapted to output the lower sideband signal of the analog audio signal from the 0 degree signal and the 90 degree signal, and to output the upper sideband signal of the analog audio signal from the 180 degree and the 270 degree signal.

8. The TDD SSB transceiver according to claim 5, wherein said second sideband switch is adapted to switch between receiving one of the upper sideband and the lower sideband of the external SSB signal in response to the control signal, and said first sideband switch is adapted to switch between transmitting one of the upper sideband and the lower sideband of the analog audio signal in response to the control signal.

* * * * *